United States Patent

[11] 3,592,485

| [72] | Inventor | Walter T. Buhl<br>Ann Arbor, Mich. |
|---|---|---|
| [21] | Appl. No. | 868,471 |
| [22] | Filed | Oct. 22, 1969 |
| [45] | Patented | July 13, 1971 |
| [73] | Assignees | Ainsworth Industries Corporation;<br>Harold F. Hadley<br>Toledo, Ohio |

[54] MANUALLY ACTIVATED LEVEL CONTROL FOR AUTOMOBILES
8 Claims, 9 Drawing Figs.

[52] U.S. Cl. .................................................. 280/124 F,
280/6 H
[51] Int. Cl. ...................................................... B60g 9/02
[50] Field of Search ........................................ 267/64 A,
64 B; 280/6 H, 124 F

[56] References Cited
UNITED STATES PATENTS
| 3,071,394 | 1/1963 | Miller............................. | 280/124 F |
| 3,140,098 | 7/1964 | Broadwell ...................... | 280/6 H |
| 3,153,425 | 10/1964 | Brueder.......................... | 280/124 F X |

*Primary Examiner*—Duane A. Reger
*Attorney*—Owen and Owen

ABSTRACT: A manually activated level control for an automobile suspension system having pneumatic support means, such as air springs or shock absorbers, and a source of air under pressure which is connected to the support means as necessary to compensate for changes in vehicle load in order to maintain a predetermined spatial relationship between the sprung body and the axle and wheels. The level control has a manually actuated pushbutton valve which supplies air under pressure to a feeler. The feeler has two relatively movable parts. The base of the feeler is mounted on either the sprung part of the vehicle (i.e., the chassis or body) or on an unsprung part, such as the rear axle, and the other part is extended by the air supplied to the feeler into contact with the other one of the chassis body or axle. If the axle is too close to the chassis, the feeler opens a port which connects the air under pressure to the support means, thus to raise the chassis relative to the axle. If the chassis and axle are too far apart, the feeler opens a port to vent the support means, thus to lower the chassis. Air is fed into or vented out of the pneumatic support means only when the pushbutton valve is actuated and only enough to bring the chassis and body to the desired, nominally "level" position relative to the axle and wheels.

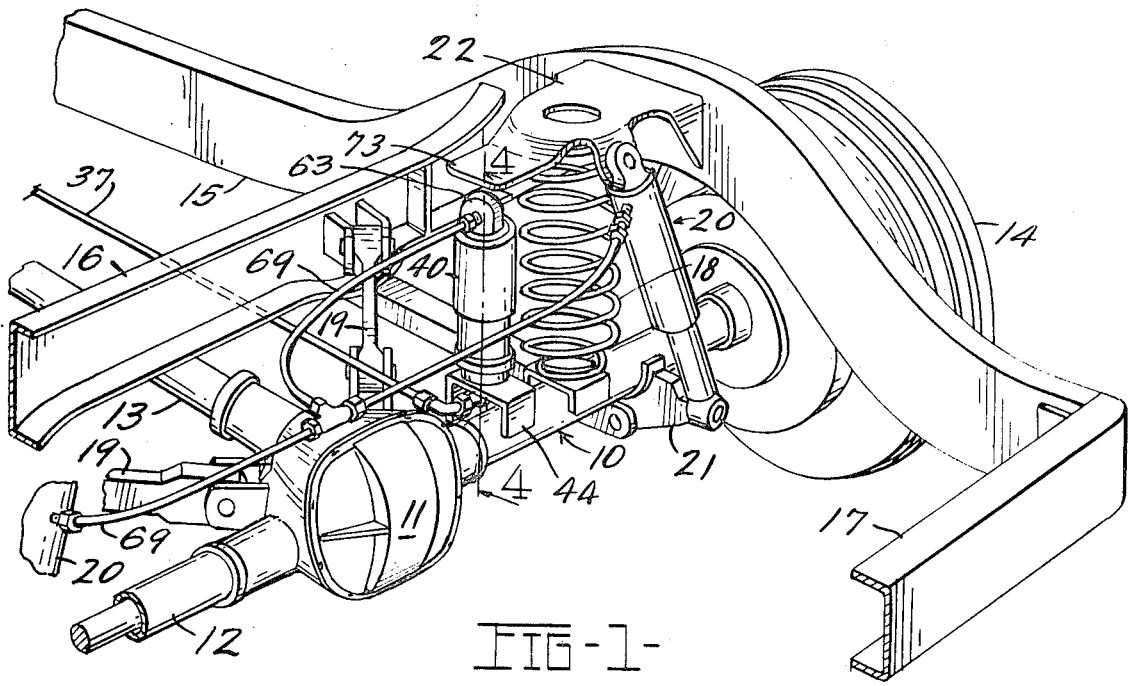
FIG-1-
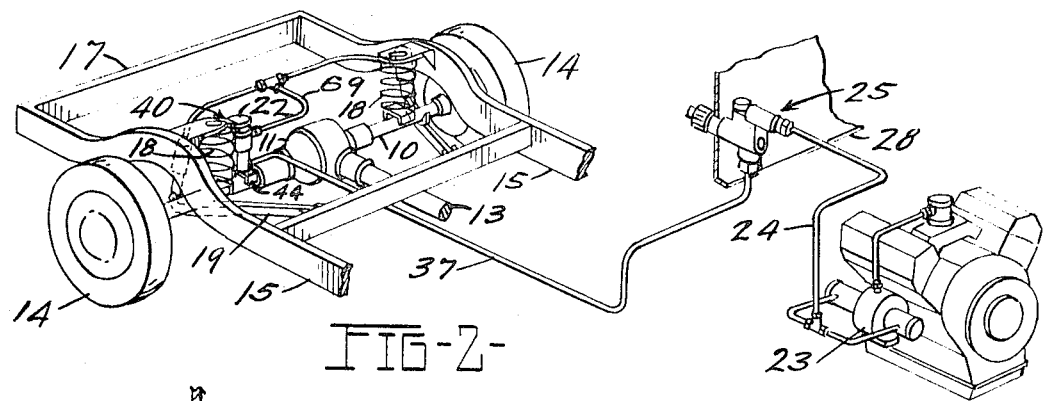
FIG-2-
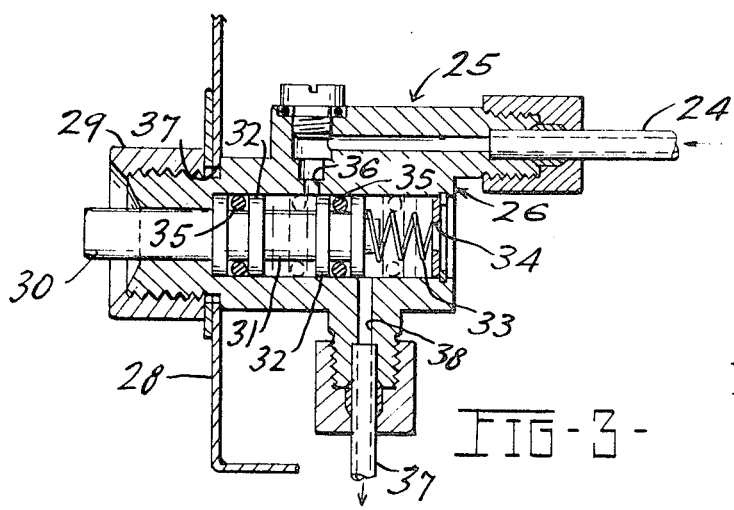
FIG-3-
INVENTOR:
WALTER T. BUHL.
BY Owen + Owen
ATT'YS.

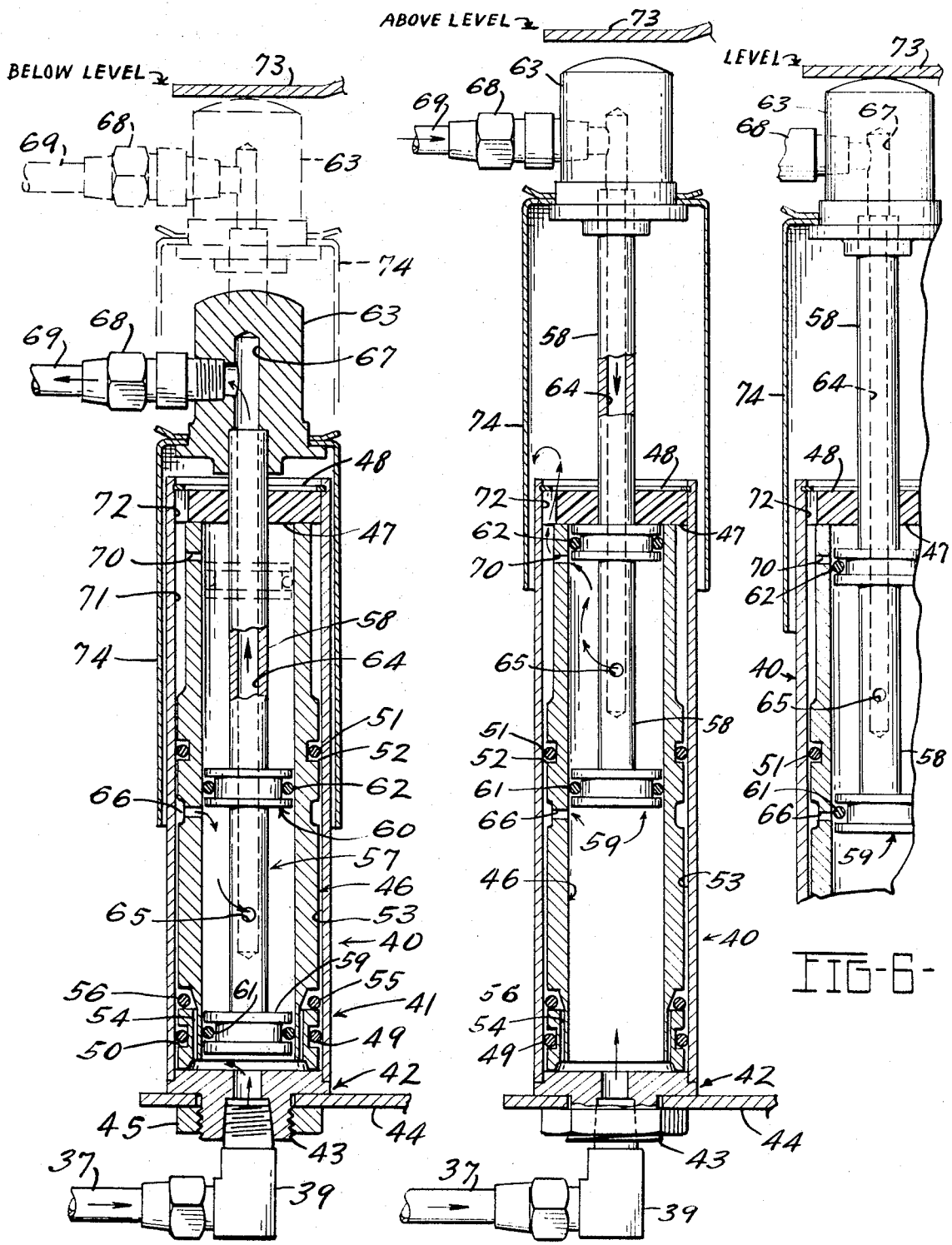

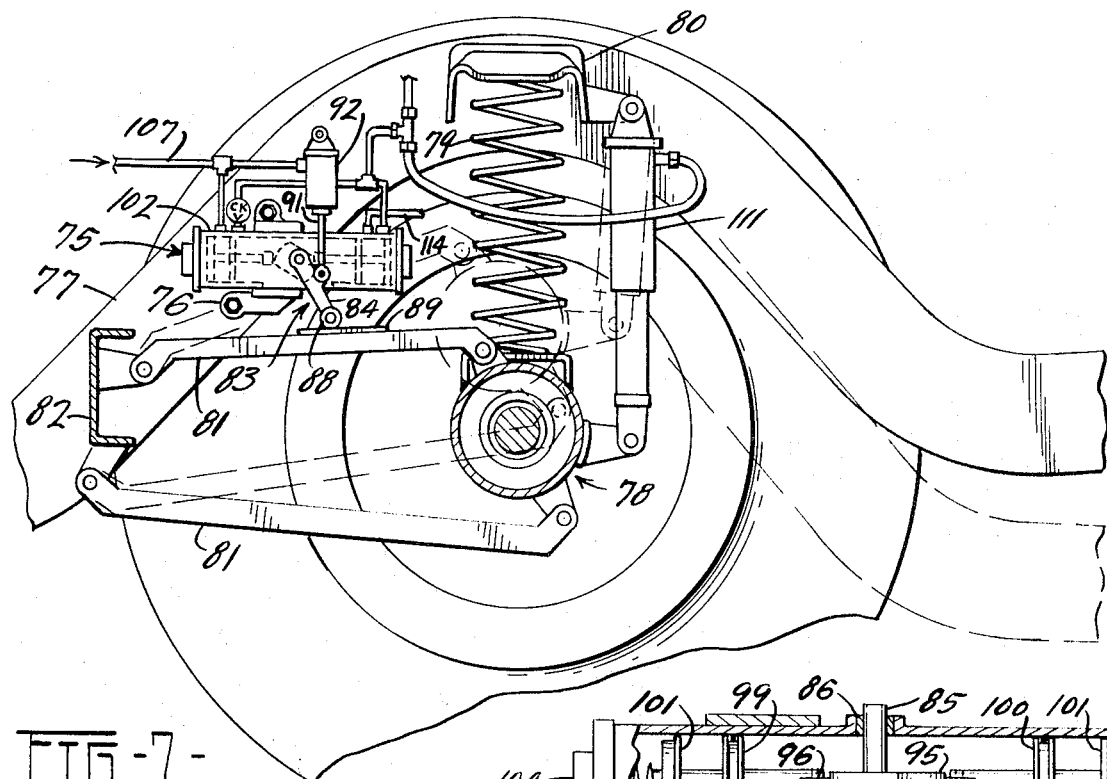
FIG-7-
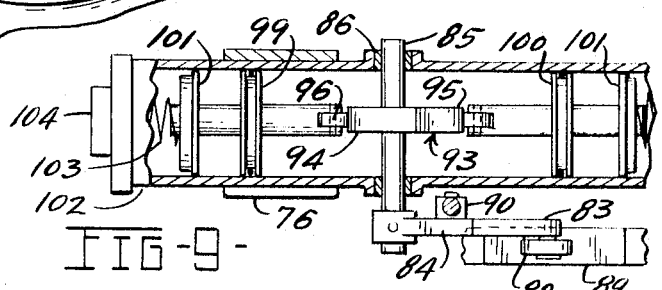
FIG-9-
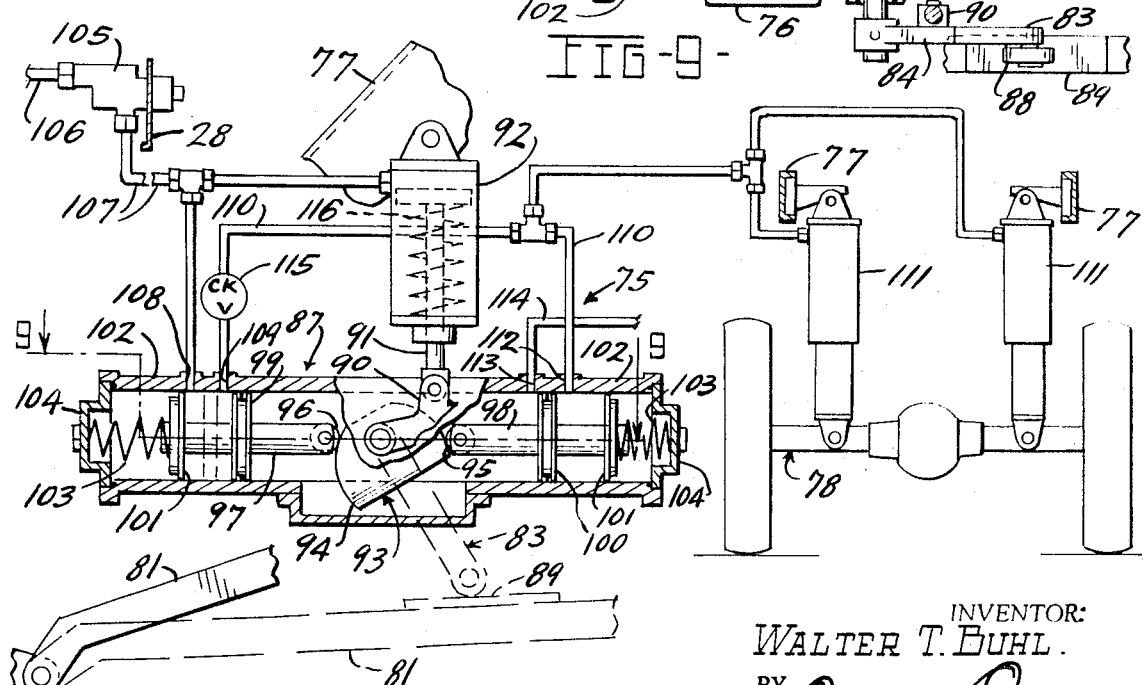
FIG-8
INVENTOR:
WALTER T. BUHL.
BY Owen + Owen
ATT'YS.

३,५९२,४८५

MANUALLY ACTIVATED LEVEL CONTROL FOR AUTOMOBILES

BACKGROUND OF THE INVENTION

Several types of pneumatic suspension means for supporting the body and chassis structure, or sprung weight, of an automobile above the axle and wheel structure, or unsprung weight, have been employed in the past. These include complete pneumatic suspension means which substitute entirely for the leaf or coil springs conventionally used in automobiles, combinations of "air bags" and coil springs, and pneumatic shock absorbers which are utilized in conjunction with coil or leaf springs.

It has also been suggested that air under greater than atmospheric pressure may be supplied to such pneumatic suspension means from a pressure tank positioned, for example, in the automobile trunk or from a compressor operated off the automobile engine directly, as by a belt drive, or a compressor of the type disclosed in Osburn U.S. Pat. No. 2,630,102 which is actuated by atmospheric pressure and which can be so designed as to stall out at the desired maximum pressure in the pneumatic suspension means.

Most of the systems employing "air bags" or pneumatic shock absorbers have had several difficulties. Among these have been the problems of control valves which are constantly agitated when the automobile travels over an irregular surface, thus resulting in excessive wear on the structures. Other systems employ vent and feed valves located, for example, on the dashboard of the automobile which require that the driver rely upon his own determination of whether the body is "high", "low" or "level". If the body is high, the driver vents air from the suspension means; if the body is low, the driver supplies air to the suspension means; sometimes also having available an air pressure gauge to indicate when the pressure of the air in the suspension means has reached a predetermined level.

Some automatic systems have been designed wherein there is a two part valve or the like, one part connected to the sprung weight of the automobile and the other part connected to the unsprung weight so that if the two structures of the automobile approach each other too closely, as for example when a heavy weight is placed in the trunk, the automatic valve means admits air to the air suspension means to raise the body. The reverse actuation takes place if a heavy weight previously carried in the rear of the automobile is removed. As mentioned, however, these automatic valve means often fail due to constant agitation because of the bouncing of the body on irregular surfaces. Some automatic control means feed air to and remove air from the pneumatic suspension means in response to minor changes in the spacing between the body structure and the axle structure which results in repeated and frequent feeding or venting of air so that the air supply is quickly exhausted or the compressor is required to operate almost constantly.

It is, therefore, the principal object of the instant invention to provide a control for a pneumatic suspension system for an automobile which has a manually operable valve simply indicated as a "level" valve which the driver presses whenever he believes that the automobile body structure is either too high or too low relative to the axle structure. The pressing of the single control activates the system embodying the invention and causes the system automatically to sense or feel the position of the sprung body structure relative to the unsprung axle structure and to either admit air to or vent air from the air suspension means to bring the two structures to the desired, predetermined "level" relationship.

It is another object of the instant invention to provide a level control for a pneumatic suspension system which is not connected to both the sprung and unsprung structures of the vehicle and, therefore, is not constantly agitated during normal operation of the vehicle.

It is yet another object of the instant invention to provide a manually activated "level" control for an automobile having a pneumatic suspension system wherein the actuation of a "level" valve results in the apparatus first determining the relative position of the body and chassis structure relative to the axle and wheel structure and, secondly and only when necessary, admitting air to or venting air from the pneumatic suspension system.

A still further object of the invention is to provide a level control having a manually activated position sensing means which can be mounted either upon the sprung part of the vehicle (i.e. the chassis or body) or upon the unsprung part of the vehicle, such as the axle and wheel structure or, for example, on the stabilizer bar structure which connects the sprung chassis and body to the unsprung axle and wheel structure.

A still further object of the instant invention is to provide a manually activated level control for a pneumatic suspension system which vents the pneumatic suspension means only when the sprung weight of the automobile i.e., the chassis and body is too high relative to the axles and wheels of the automobile but does not vent air from the pneumatic suspension system under any other conditions. This materially reduces the need for air under pressure to keep the suspension in its proper pressurized condition and thus substantially reduces the requirements for a source of air under pressure such as a pressure tank or the wear on the device such as a compressor driven either by the automobile engine or by atmosphere as has been provided in the prior art.

BRIEF DESCRIPTION OF THE DRAWINGS

FIG. 1 is a fragmentary view in perspective showing the rear part of an automobile chassis, axle and one wheel and illustrating how a first embodiment of the feeler or sensing mechanism of a control according to the invention is mounted in order to determine the relative position of the sprung and unsprung weights of the automobile and also showing a conventional location for a pneumatic shock absorber which is employed in order to at least partially support the sprung structure of the automobile;

FIG. 2 is a fragmentary diagrammatic view illustrating a control embodying the invention including a manually operable valve as connected to a source of air under pressure, in this illustration, an atmosphere actuated compressor;

FIG. 3 is a fragmentary vertical sectional view of a manually operable valve mounted upon the dashboard of an automobile, by which the operator may activate the control system of the invention in order to result in the sprung and unsprung weights of the automobile being brought to their desired "level" spacing;

FIG. 4 is a fragmentary vertical sectional view on an enlarged scale, with parts broken away, of a feeler mechanism embodying part of the control of the instant invention and showing the relative position of the feeler parts when the body and chassis structure of the automobile is below "level" position relative to the wheel and axis structure;

FIG. 5 is a fragmentary vertical sectional view similar to FIG. 4, but showing a movable member of the feeler mechanism in its most advanced position immediately after activation, when the unsprung chassis and body structure is located at a point above its desired "level" position relative to the wheel and axis structure;

FIG. 6 is a fragmentary vertical sectional view, similar to FIGS. 4 and 5, but showing the position of the feeler mechanism members when the sprung and unsprung weights or structures of the automobile are positioned at "level" position relative to each other;

FIG. 7 is a fragmentary vertical sectional view illustrating a manually activated level control according to a second embodiment in the invention, as mounted to control the relative positions of a sprung automobile body and chassis structure and an unsprung axle and wheel structure, the feeler mechanism in this embodiment being mounted to sense the distance between the sprung structure and the position of a stabilizer bar connecting the sprung and unsprung structures;

FIG. 8 is a fragmentary view, partly in section and somewhat diagrammatic of the feeler mechanism according to this second embodiment of the invention; and FIG. 9 is a fragmentary horizontal sectional view taken along the line 9-9 of FIG. 8.

DESCRIPTION OF PREFERRED EMBODIMENTS

In FIG. 1 there are fragmentarily illustrated some of the parts of an automobile which may generally be classified as the unsprung axle structure and the sprung body and chassis structure. A rear axle 10, a drive differential 11, an opposed rear axle 12, a torque or propeller tube 13 and a rear wheel 14 and their associated parts constitute the unsprung axle and wheel structure of the automobile.

An automobile chassis comprising longitudinal frame members such as the member 15, cross member 16 and a rear cross member 17 as well as the body mounted on this chassis, are supported in sprung condition above the axle structure by coil springs 18. The coil spring 18 functions to support the sprung structure of the automobile but, it is to be understood, this is merely one of several conventional springing structures and leaf or other springs may also be employed. The sprung and unsprung structures are connected to each other by stabilizing bars 19 which are pivotally connected at one end to the sprung structure, i.e., the cross member 16 and at the other end to the axle structure, in this case the housing for the differential 11.

In FIG. 1 there is also shown one of a pair of pneumatic shock absorbers 20 extending between a bracket 21 on the axle 10 and a plate 22 which is a part of the sprung chassis of the automobile. The pneumatic shock absorbers 20 as illustrated in FIG. 1, are of a type such that the admission of air into their interiors or outer chambers "stiffens" the shock absorbers 20 directly in proportion to the air pressure therein so that greater or less support to the sprung chassis and body is provided by the shock absorbers 20, in connection with the springs 18, as necessary to support the sprung weight of the body plus the load carried by the body.

In the arrangement as illustrated in FIGS. 1 and 2, a double-acting air compressor 23 is illustrated as being mounted upon the automobile engine and as operating according to the above mentioned Osburn U.S. Pat. No. 2,630,102 in order to supply air under greater than atmospheric pressure to a first air line 24 connecting the compressor 23 to a manually operable valve generally indicated by the reference number 25.

As illustrated in detail in FIG. 3 the manually operable valve 25 has a generally cylindrical body 26 that protrudes through an opening 27 in the dashboard 28 of the automobile. A collar 29 is threaded on the protruding front end of the body 26 to lock the valve 25 in place. A pushbutton end 30 of a valve plunger 31 protrudes through the collar 29 interiorly into the automobile so that the operator can actuate the valve 25 as desired. The plunger 31 comprises two spaced valve heads 32 and the plunger 31 is biased forwardly by an interior spring 33. An orifice 34 at the rear of the body 26 vents the interior of the valve body 26 behind the rearmost head 32 to atmosphere.

In the position illustrated in FIG. 3, the spring 33 is illustrated as thrusting the valve plunger 31 and heads 32 into their forward position so that O-rings 35 close off an inlet port 36 which is in communication with the first air line 24. In this position of the manually operable valve 25, a second air line 37 communicates with atmosphere through the orifice 34 in the rear of the valve body 26. When the driver of the automobile presses the pushbutton end 30 the valve heads 32 are moved rearwardly to the dotted line position in FIG. 3, and the first air line 24 is placed in communication with the second air line 37 through its port 38.

The second air line 37 leads to the rear of the automobile where it is connected by a coupling 39 (FIGS. 4 and 5) to a feeler mechanism generally indicated by the reference number 40 and shown in detail in FIGS. 4, 5 and 6. The feeler mechanism 40 comprises a tubular jacket 41, the lower end of which is closed by a stepped end plug 42. The end plug 42 has a threaded neck 43 which extends through a suitable opening in a mounting saddle 44 that may be welded, for example, or otherwise secured to the axle 10 (see FIG. 1). A locking nut 45 is threaded onto the neck 43 to retain the plug 42 in place on the saddle and thus to keep the feeler 40 in erected position. The coupling 39 is threaded into the plug 42 to place the second air line 37 in communication with the interior of the jacket 41.

A tubular liner 46 is positioned interiorly of the jacket 41 with its lower end resting on the inner face of the plug 42 and its upper end extending into contact with a spacing collar 47 at the upper end of the jacket 41, the collar 47 being retained in place by a snap ring 48 that is engaged in an annular groove near the end of the jacket 41.

An O-ring 49 is positioned in an annular groove 50 in the outer surface of the liner 46 near its lower end and a second O-ring 51 is similarly positioned in a groove 52 near the midpoint of the outer surface of the liner 46. The O-rings 49 and 51 seal an annular chamber 53 which surrounds the lower part of the liner 46 interiorly of the jacket 41. A plurality of axially extending passageways 54 are drilled through the wall of the liner 46, by-passing the O-ring 49 and leading from the open lower end of the liner 46 to the inner side of a check ring recess 55 cut in the outer surface of the liner 46 at a point above the annular O-ring groove 50. The inner, generally axially extending wall of the recess 55 is outwardly flared and an O-ring 56 is positioned in the recess 55 to function as a check valve.

The inner liner 46 functions as a cylinder for a movable member, generally indicated by the reference number 57, which is extended when air under pressure is admitted into the lower end of the feeler 40 by actuation of the manually operable valve 25. The movable member 57 comprises a stem 58 which carries a valve head 59 at its lowermost end and a second valve head 60 that is generally located near the middle of the liner 46 when the member 57 is in the retracted position as illustrated in FIG. 4. Each of the valve heads 59 and 60 has a sealing O-ring 61 or 62.

The upper end of the stem 58 extends through a center opening in the collar 47 and carries a head 63. The stem 58 is hollow, having an interior passageway 64 which communicates through a radial opening 65 with the interior of the liner 46 between the valve heads 59 and 60. This interior space is kept in communication with the annular chamber 53 surrounding the lower end of the liner 46 by one or more radial ports 66 drilled through the wall of the liner 46 at a position just below the O-ring 62 of the valve head 60 when the movable member 57 is in its retracted position as illustrated in FIG. 4. The inner passageway 64 of the stem 58 communicates with an interior bore 67 in the head 63 and, by a coupling 68, is connected to a third air line 69 leading from the feeler mechanism 40 to the pneumatic shock absorbers 20 (see FIG. 1).

A second set of radial valve ports 70 is drilled through the wall of the liner 46 near its upper end to connect the upper end of the interior of the liner 46 to an annular chamber 71 surrounding the liner 46 above the O-ring 51 and permanently in communication with atmosphere through one or more axial grooves 72 in the collar 47 as can best be seen by reference to FIG. 5.

When the automobile operator presses the pushbutton end 30 of the manually operable valve 25, the first air line 24 from the source of air under pressure is placed in communication with the second air line 37 leading to the bottom of the feeler 40. Air flows into the lower end of the liner 46 where it exerts pressure against the bottom end of the valve head 59.

The air under greater pressure exerts force against the head 59 as a piston and moves the entire member 57 upwardly extending its head 63 toward that part of the body or chassis which is in line to be engaged by the head and which is indicated in this embodiment of the invention by a horizontal plate 73. At the same time, air from the second air line 37 flows through the passageways 54 and into the recess 55 lifting the check ring 56, upwardly and outwardly along the conical inner surface of its recess 55 so that air also flows axially through the annular chamber 53 exteriorly of the lower end of the liner 46. During the time when the movable member 57 is moving upwardly, air flows from the chamber 53 through the first valve ports 66 into the interior of the liner 46 between the two valve heads 59 and 60. The air then flows through the radial opening 65 into the inner passageway 64 of the stem 58 and from the passageway 64 to the bore 67 of the head 63, the coupling 68 and the third air line 69 to the pneumatic shock absorbers 20.

With the feeler 40 starting from its retracted position (just below that illustrated in FIG. 4), activation of the system by the manually operable valve 25 immediately places the source of air under pressure in direct communication with the pneumatic suspension means, i.e. the shock absorbers 20 in this illustrated structure. At the same time, the feeler 40 is activated to extend its position sensing head 63 upwardly toward the sprung body structure comprising the engaging plate 73. As the air under pressure is fed into the pneumatic suspension means (the shock absorbers 20) the body and chassis structure is raised relative to the wheels and axle. Simultaneously therewith the feeler head 63 moves upwardly as the part it engages viz, the plate 73, is raised relative to the mounting saddle 44 upon which the feeler 40 is positioned. Such a movement is shown in broken lines in FIG. 4 where the engaging plate 73 is shown as "below level" meaning that the sprung body and chassis structure of the automobile is below its "level" spacing relative to the wheel and axle structure of the automobile. This condition might result, for example, if a heavy load were placed in the trunk or rear portion of the automobile equipped with the suspension system according to the invention.

Air continues to flow through the path described above until such time as the sprung chassis and body structure is elevated to its "level" position relative to the wheel and axis. At this point in the extension of the movable member 57 upwardly, the sealing O-ring 61 of the lower valve head 59 moves above the lower valve ports 66 (see FIG. 6) and the valve ports 66 now establish communication between the interior of the liner 46 below the first valve head 59 and the annular chamber 53 exteriorly of the liner 46. When the lower valve head 59 reaches the position shown in FIG. 6, air pressure in the lower end of the liner 46, the lower valve ports 66 and on both sides of the check valve ring 56, is equalized. Because the lower valve O-ring 61 has passed upwardly beyond the lower valve ports 66, air from the source line 37 no longer can reach the opening 65 into the interior passageway 64 of the stem 58 so the flow of air to the third air line 69 and the shock absorbers 20 is stopped.

If the chassis and body structure is above its level position, as illustrated in FIG. 5, air admitted to the lower end to the liner 46 continues to thrust the movable member 57 upwardly to the limit of its travel when the upper surface of the upper valve head 60 strikes the inner side of the spacing collar 47. Before reaching this upper most position, the sealing O-ring 62 passes above the second valve ports 70 and places the third air line 69 in communication with the exhaust passages 72 to atmosphere. The air in the pneumatic shock absorbers now flows backwardly through the third air line 69, the bore 67 in the head 63, the interior passageway 64 of the stem 58, out the opening 65 and the second valve port 70 to the annular chamber 71 and through the grooves 72 to atmosphere. This vents the pneumatic shock absorbers 20, lowering the body and chassis structure until the engaging plate 73 strikes the head 63.

The weight of the descending body and chassis structure pushes the head 63 downwardly, moving the upper valve head 60 downwardly until its sealing ring 62 again crosses the second valve port 70 and reaches the position illustrated in FIG. 6. This position of the movable member 57 closes the valve port 70 but does not open the lower valve port 66 because the lower valve head 59 is located just above the valve port 66 at the time when the upper valve head 60 is positioned just below the upper valve port 70. Thus the entire air system is centered at "level" position and the body and chassis members are at "level" spacing relative to the wheel and axle structure of the automobile.

As soon as the operator senses that the automobile body has reached its "level" position by moving downwardly or upwardly, depending upon its position when the manually operable valve 25 was energized, the operator releases the pushbutton end 30 of the valve 25 which allows its spring 33 to thrust the valve into the position illustrated in FIG. 3. This immediately places the interior of the liner 46 below the lower valve head 59 and the second air line 37 in communication with the atmosphere through the vent orifice 34 at the rear of the manual valve body 26 so that the pressure beneath the lower valve head 59 of the feeler 40 is relieved. Gravity and/or contact of the plate 73 with the head 63 during normal road action moves the member 57 downwardly to its retracted position.

A dust cover 74 is illustrated in FIGS. 4, 5 and 6 as being carried by the movable member head 63 to enclose the upper end of the feeler 40 to protect its various parts from road dust, water, etc.

In this embodiment of the invention, the distance between the sealing lines of the O-rings 61 and 62 relative to the spacing between the lower valve port 66 and the upper valve port 70 provides for a "level tolerance" of a fractional part of an inch. Whenever the movable member 57 reaches the position shown in FIG. 6, within the tolerance thus determined, the "level" spacing between the sprung body and chassis relative to the unsprung wheel and axle has been accomplished.

A second embodiment of the invention is illustrated in FIGS. 7, 8 and 9. In this embodiment of the invention, a feeler, generally indicated by the reference number 75, is mounted by a bracket 76 on a longitudinal chassis member 77 near a rear axle generally indicated by the reference number 78. The automobile also has a conventional coil spring 79 extending between the axle 78 and a suitable spring bracket 80 on the chassis member 77. Conventional stabilizer bars 81 are linked between the chassis member 77 or a cross member 82 and the axle 78.

In this embodiment as in the embodiment illustrated in FIGS. 1—6, inclusive, the feeler 75 comprises a movable member 83 comprising an arm 84 that is pinned or otherwise secured on a horizontal rocking shaft 85. The shaft 85 is journaled in suitable bearings 86 in the walls of a feeler housing 87. The arm 84 has a contact roller 88 on its lower end which is adapted to engage a plate 89 fixed on the upper one of the stabilizer bars 81. The arm 84 has an ear 90 which is pivotally connected to the end of a piston rod 91 of a pneumatic cylinder 92. The cylinder 92 is pivotally connected at its upper end to the chassis member 77. When air under pressure is admitted into the cylinder 92 it extends its piston rod 91 swinging the arm 84 downwardly until its roller 88 strikes the plate 89 which, of course, moves vertically relative to the feeler housing 87 as the load on the chassis structure is increased or decreased.

The two-lobe cam 93 is secured on the shaft 85 interiorly of the housing 87 and its opposed lobes 94 and 95 are engaged by rollers 96 on the ends of a pair of horizontally movable valve stems 97 and 98. Each of the valve stems 97 and 98 carries a valve head 99 or 100, respectively, and is guided in its horizontal movement by a guide disc 101 of the same diameter as the valve head 99 or 100. Each of the valve heads 99 and 100 and its respective guide disc 101 reciprocates in one of a pair of opposed cylinders 102. The valve stems 97 and 98 and their respective valve heads 99 and 100 are urged inwardly, maintaining contact of their rollers 96 with the cam lobes 94 and 95, by springs 103 located in the ends of the respective cylinders 102, which are sealed by end caps 104.

As in the embodiment of the invention illustrated in FIGS. 1—6, inclusive, this second embodiment of the invention has a manually operable valve 105 identical in design and function to the manually operable valve 25 illustrated in detail in FIG. 3. A first air line 106 connects the valve 105 to a source of air under pressure such as a pressure tank, a compressor or a pump, and a second air line 107 connects the manually operable valve 105 through a port 108 to the left cylinder 102 of the feeler housing 87.

When the manually operable valve 105 is actuated by a vehicle driver, the pneumatic cylinder 92 and the entire feeler 75 is activated by the high pressure air thus fed into the line 107. The cylinder 92 extends its piston rod 91 swinging the movable member 83 downwardly until the roller 88 engages the striker plate 89 on the stabilizer bar 81. If the body and chassis structure is below its "level" spacing above the axle 78, as illustrated in solid lines in FIG. 8, the movable member 83 strikes the plate 89 quickly so that the cam 93 stops in the position illustrated in FIG. 8. In this position the highest portion of the cam lobe 95 is engaged by the roller 96 on the valve stem 98 and the valve stem 98 is thrust outwardly compressing its spring 103, to position the valve head 100 in the location illustrated at the right side of FIG. 8. Conversely, the cam lobe 94 is at its lowest height so that the spring 103 thrusts the valve stem 97 inwardly moving its valve head 99 to the position illustrated at the left side of FIG. 8.

When the valves 99 and 100 are in the positions of FIG. 8, the second air line 107 is placed in communication with a port 109 of a third air line 110 connected directly to pneumatic shock absorbers 111. Thus, with the body and chassis structure below its "level" spacing, air under pressure is immediately delivered to the pneumatic shock absorbers 111 to raise the body and chassis structure relative to the axle structure.

As the body and chassis structure is raised, the continued high pressure air present in the air cylinder 92 swings the member 83 downwardly following the upper stabilizer bar 81 as it moves downwardly relative to the body and chassis structure. When the body and chassis structure has been elevated to its "level" distance from the axle 78, the cam 93 reaches its median or central position and both of the valve stems 97 and 98 moved to the dotted line position shown in FIG. 8. This closes off the third air line 110 from the second air line 107 because the valve 99 reaches a position between the inlet port 108 and the port 109 for the third air line 110. During the elevation of the body and chassis structure from its low position, the valve head 100 is positioned intermediate a second port 112 for the third air line 110 and a port 113 for a vent line 114.

When the body and chassis structure reaches "level" position, and the cam 93 has reached its median "level" position, the inlet valve 99 has moved just to the left of the port 109 for the third air line 110 and, similarly, the vent valve 100 has moved to the left but has not yet opened the port 113 to the vent line 114. Therefore, when the operator releases the manually operable valve 105 the system remains closed and the air which has been fed in the pneumatic shock absorbers 111 is retained therein.

If the body and chassis structure is above its "level" spacing relative to the axle 78 when the operator actuates the valve 105, the movable member 83 of the feeler 75 swings downwardly to its maximum position and may not even reach the stabilizer bar 81. In this event the two-lobe cam 93 is swung approximately 60° or so in a clockwise direction from the position illustrated in FIG. 8 to hold the valve 99 and the vent valve 100 substantially to the left of their positions as shown in FIG. 8. When the valve 99 is moved beyond the port 109 for the air line 110, the high pressure air line 107 can no longer feed air through the third air line 110 to the pneumatic shock absorbers 111. However, at the same time, the vent valve 100 has been moved substantially to the left in FIG. 8 placing the exhaust port 112 of the third air line 110 in communication with the port 113 of the vent line 114. A check valve 115 prevents back flow from the third air line 110. Under these conditions the excess air in the pneumatic shock absorbers 111 is vented until the body and chassis structure is lowered to a position such that the engaging plate 89 of the stabilizer bar 81 engages the roller 88 of the movable member 83 to swing it a counterclockwise direction and move the valves 99 and 100 to their "level" position, isolating the vent line 114 from the third air line 110.

After the body and chassis structure has been restored to "level" spacing relative to the axle 78, the vehicle operator releases the manually operable valve 105 which, as explained above with respect to FIG. 3, vents the second air line 107 to atmosphere through the rear of the manually operable valve 105. This releases the air pressure in the cylinder 92 above its piston and a spring 116, located in the cylinder 92 below the head of the piston rod 91, thrusts the piston rod 91 upwardly pulling the movable member 83 to its retracted position.

What I claim is:

1. A manually activated level control for an automobile having a sprung body structure and an unsprung axle structure and including pneumatic means for at least partially supporting the sprung structure of said automobile above the unsprung structure of said automobile, the vertical distance between said structures varying inversely to the load on said sprung structure and there being a desired "level" spacing between said structures, said control comprising, in combination, a source of air under greater than atmospheric pressure, a feeler mounted on one of said automobile structures and comprising a member movable toward a part of the other of said automobile structures in response to the admission of air under pressure into said feeler, said member being movable from a retracted position to a predetermined "level" position and beyond such "level" position toward said other automobile structure when said automobile structures are spaced at a distance greater than such "level" spacing therebetween, a part of the said other of said automobile structures that is engageable by said movable member when the spacing between said structures is less than "level" spacing, a manually operable valve, a first air line connecting said manually operable valve to said air source, a second air line connecting said manually operable valve to said feeler, said manually operable valve being actuatable for placing said air source in communication with said feeler, a third air line connecting said feeler to said pneumatic support means, a first valve movable with said member for connecting said second air line to said third air line during movement of said member toward such predetermined "level" position thereof, and a second valve movable with said member for connecting said third air line to atmosphere when said member is extended beyond such "level" position.

2. A level control according to claim 1 in which the feeler comprises an air cylinder, a piston in said cylinder, a contact member movable with said piston and adapted to engage the other automobile structure and in which the first and second valves are alternatively opened by movement of said movable contact member.

3. A level control according to claim 1 in which the feeler comprises an air cylinder and a piston and rod in said air cylinder; each of the first and second valves consists of a valve port in the wall of said cylinder and a valve head on said piston rod; and the movable member is a head on the end of said piston rod.

4. A level control according to claim 1 in which the feeler comprises an air cylinder and a piston in said cylinder; the first valve comprises a port communicating with the source of air under pressure and communicating through the respective one of the air lines with the pneumatic support means; the second valve comprises a port communicating through such air line to atmosphere and valve actuators for said valves that are movable with the movable member for alternatively opening said valves.

5. A level control according to claim 4 in which each of the first and second valves consists of a cylinder having a closed end and two axially spaced air line ports in its wall and a piston movable in said cylinder between a position intermediate said ports and a position wherein said ports are located between said closed end and said piston; and a mechanical operating connection between the movable member and said valve pistons for alternatively moving said pistons between such positions.

6. A manually activated level control for an automobile, said control comprising, in combination, a source of air under greater than atmospheric pressure, a feeler mounted on one structure of the automobile that is connected to another structure by pneumatic support means, said feeler comprising a member movable toward a part of the other of said automobile structures in response to the admission of air under pressure into said feeler, a manually operable valve, a first air line connecting said valve to said air source, a second air line connecting said valve to said feeler, said manually operable valve being actuatable for placing said air source in communication with said feeler, a third air line connecting said feeler to said pneumatic support means, a first valve movable with said member for connecting said second air line to said third air line during movement of said member toward the other of said automobile structures and a second valve movable with said member for connecting said third air line to atmosphere when said member is fully extended.

7. A manually activated level control for an automobile having pneumatic body support means, said control comprising, in combination, a source of air under greater than atmospheric pressure, a feeler mechanism positioned between the sprung and unsprung structures of said automobile, said feeler being mounted on one of said structures and comprising a member movable toward a part of the other of said structures in response to the admission of air under pressure into said feeler, a manually operable valve, a first air line connecting said valve to said air source, a second air line connecting said valve to said feeler mechanism, said manually operable valve being actuatable for placing said air source in communication with said feeler mechanism, a third air line connecting said feeler mechanism to said pneumatic support means, a first valve movable with said member for connecting said second air line to said third air line during movement of said member toward a predetermined "level" position thereof, and a second valve movable with said member for connecting said third air line to atmosphere when said member is moved beyond such "level" position.

8. In a level control for an automobile having pneumatic suspension means between the sprung and unsprung structures of said automobile, said control comprising an air cylinder mounted on one of said structures, a piston rod in said cylinder, the end of said rod protruding through one end of said cylinder toward the other of said structures, and said rod being movable between a retracted position and an extended position, two valve heads on said piston rod, one of said valve heads being carried at the inner end of said rod and the second of said valve heads being carried on said rod at a position approximately midway of said cylinder when said rod is in retracted position in said cylinder, a first valve port in the wall of said cylinder at the inner side of said second valve head when said rod is in retracted position, a second valve port in the wall of said cylinder at the inner side of said second valve head when said rod is in fully extended position, said second valve port communicating with atmosphere, a source of air under pressure, a manually operable activating valve mounted interiorly of said automobile, a first air line connecting said source to said activating valve, a second air line connecting said activating valve to the inner end of said cylinder and to said first valve port, and a third air line connecting said pneumatic support means to the interior of said cylinder between said valve heads, the axial distance between said valve heads being less than the axial distance between said first and second valve ports, whereby said first valve port is isolated from said third air line as said rod is extended before said second valve port is placed in communication with said third air line.